(12) United States Patent
Nishizaka

(10) Patent No.: US 9,554,112 B2
(45) Date of Patent: Jan. 24, 2017

(54) REPLAY CONTROL APPARATUS FOR SIMULTANEOUSLY REPLAYING MOVING IMAGE DATA

(71) Applicant: CASIO COMPUTER CO., LTD., Shibuya-ku, Tokyo (JP)

(72) Inventor: Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 445 days.

(21) Appl. No.: 14/049,087

(22) Filed: Oct. 8, 2013

(65) Prior Publication Data

US 2014/0112643 A1 Apr. 24, 2014

(30) Foreign Application Priority Data

Oct. 19, 2012 (JP) ................................ 2012-232318

(51) Int. Cl.
*H04N 9/80* (2006.01)
*H04N 9/87* (2006.01)
(Continued)

(52) U.S. Cl.
CPC .......... *H04N 9/87* (2013.01); *G11B 20/10527* (2013.01); *G11B 27/10* (2013.01); *H04N 5/772* (2013.01); *H04N 5/783* (2013.01); *H04N 9/8205* (2013.01); *H04N 9/8227* (2013.01); *G11B 2020/10546* (2013.01); *G11B 2020/10592* (2013.01)

(58) Field of Classification Search
CPC ........ H04N 5/85; G11B 27/34; A63B 69/3614
USPC ................... 386/239, 248; 715/723; 473/151
See application file for complete search history.

(56) References Cited

U.S. PATENT DOCUMENTS 6,560,399 B2 5/2003 Sato et al.
2002/0064764 A1 5/2002 Fishman et al.
(Continued)

FOREIGN PATENT DOCUMENTS

JP 10-145724 A 5/1998
JP 10-304299 A 11/1998
(Continued)

OTHER PUBLICATIONS

Japanese Office Action dated Dec. 24, 2014, issued in counterpart Japanese Application No. 2012-232318.
Korean Office Action dated Nov. 26, 2014, issued in counterpart Korean Application No. 10-2013-0124446.
Japanese Office Action (and English translation thereof) dated Apr. 5, 2016, issued in counterpart Japanese Application No. 2012-232318 (Appeal Request No. 2015-11092).

*Primary Examiner* — Thai Tran
*Assistant Examiner* — Mishawn Hunter
(74) *Attorney, Agent, or Firm* — Holtz, Holtz & Volek PC

(57) ABSTRACT

A simultaneous replay information storage unit stores a replay condition when simultaneously replaying the plurality of pieces of moving image data constituting the set of moving images so as to correspond to each of the sets of moving images in which a combination of the plurality of pieces of moving image data is different, respectively. A simultaneous replay control unit simultaneously replays, in a case in which the set of moving images as a replay target is designated from among a plurality of sets of moving images stored in the simultaneous replay information storage unit, a plurality of pieces of moving image data constituting the set of moving images, with a replay condition that is stored to be associated with the designated set of moving images.

14 Claims, 16 Drawing Sheets

(51) Int. Cl.
*G11B 20/10* (2006.01)
*G11B 27/10* (2006.01)
*H04N 5/77* (2006.01)
*H04N 5/783* (2006.01)
*H04N 9/82* (2006.01)

(56) References Cited

U.S. PATENT DOCUMENTS

| | | | | |
|---|---|---|---|---|
| 2005/0153785 | A1* | 7/2005 | Sun | A63B 24/0003 |
| | | | | 473/151 |
| 2006/0059426 | A1* | 3/2006 | Ogikubo | G11B 27/034 |
| | | | | 715/723 |
| 2008/0088747 | A1* | 4/2008 | Kita | H04N 5/232 |
| | | | | 348/715 |

FOREIGN PATENT DOCUMENTS

| | | |
|---|---|---|
| JP | 10-309335 A | 11/1998 |
| JP | 2000115695 A | 4/2000 |
| JP | 2001-036867 A | 2/2001 |
| JP | 2003169297 A | 6/2003 |
| JP | 2004260765 A | 9/2004 |
| JP | 2006080735 A | 3/2006 |
| JP | 2008054265 A | 3/2008 |
| JP | 2010178007 A | 8/2010 |
| JP | 2012096026 A | 5/2012 |

* cited by examiner

| MOVIE A \ MOVIE B | NORMAL MOVIE (FHD/HD/STD/HS120/ HS240/HS480/HS1000) | GOLF BS MOVIE (HS120/240) | PROFESSIONAL GOLFER MOVIE |
|---|---|---|---|
| NORMAL MOVIE (FHD/HD/STD/HS120/ HS240/HS480/HS1000) | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS |
| GOLF BS MOVIE (HS120/240) | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS |
| PROFESSIONAL GOLFER MOVIE | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS | • TWO SCREEN COMPARISON AVAILABLE WITH THE SAME TYPE OF MOVIE<br>• TWO SCREEN REPLAY UP TO 5 SECONDS |

REPLAY CONTROL APPARATUS FOR SIMULTANEOUSLY REPLAYING MOVING IMAGE DATA

This application is based on and claims the benefit of priority from Japanese Patent Application No. 2012-232318, filed on 19 Oct. 2012, the content of which is incorporated herein by reference.

BACKGROUND OF THE INVENTION

Field of the Invention

The present invention relates to a replay control apparatus that simultaneously replays moving image data, a replay control method, and a storage medium.

Related Art

Conventionally, a technology exists for simultaneously replaying two sets of moving image data that are recorded separately. More specifically, a technology exists for simultaneously replaying moving image data in a remote location and moving image data at hand by matching the timing of time therebetween (for example, refer to Japanese Unexamined Patent Application, Publication No. H10-309335). Furthermore, a technology exists for synchronizing and replaying a plurality of sets of moving image data by setting a synchronization start point for synchronizing and replaying the plurality of sets of moving image data (for example refer to Japanese Unexamined Patent Application, Publication No. 2001-36867).

SUMMARY OF THE INVENTION

An aspect of the present invention is a replay control apparatus that controls replaying as a unit a set of moving images that is composed of a plurality of pieces of moving image data as a target for simultaneous replay, the apparatus including:

a simultaneous replay information storage unit that stores a replay condition when simultaneously replaying the plurality of pieces of moving image data constituting the set of moving images so as to correspond to each of the sets of moving images in which a combination of the plurality of pieces of moving image data is different, respectively; and a simultaneous replay control unit that, in a case in which the set of moving images as a replay target is designated from among a plurality of sets of moving images stored in the simultaneous replay information storage unit, simultaneously replays a plurality of pieces of moving image data constituting the designated set of moving images, with a replay condition that is stored to be associated with the designated set of moving images.

Furthermore, another aspect of the present invention is a replay control method executed by a replay control apparatus that controls replaying as a unit a set of moving images that is composed of a plurality of pieces of moving image data as a target for simultaneous replay, the method including:

a replay condition storage step of storing a replay condition when simultaneously replaying the plurality of pieces of moving image data constituting the set of moving images so as to correspond to each of the designated sets of moving images in which a combination of the plurality of pieces of moving image data is different, respectively; and a simultaneous replay control step of simultaneously replaying, in a case in which the set of moving images as a replay target is designated from among a plurality of sets of moving images stored in the replay condition storage step, a plurality of pieces of moving image data constituting the set of moving images, with a replay condition that is stored to be associated with the designated set of moving images.

Still another aspect of the present invention is a non-transitory storage medium encoded with a computer-readable program that enables a computer executing to control to replay as a unit a set of moving images that is composed of a plurality of pieces of moving image data as a target for simultaneous replay; to execute functions as:

a simultaneous replay information storage unit that stores a replay condition when simultaneously replaying the plurality of pieces of moving image data constituting the set of moving images so as to correspond to each of the sets of moving images in which a combination of the plurality of pieces of moving image data is different, respectively; and a simultaneous replay control unit that, in a case in which the set of moving images as a replay target is designated from among a plurality of sets of moving images stored in the simultaneous replay information storage unit, simultaneously replays a plurality of pieces of moving image data constituting the designated set of moving images, with a replay condition that is stored to be associated with the designated set of moving images.

BRIEF DESCRIPTION OF THE DRAWINGS

FIG. 3 is a diagram showing a direction-correspondence table for setting an arrangement condition that is stored in a storage unit of FIG. 1;

FIG. 5 is a diagram showing a moving image type-correspondence table for generating a set of moving images, stored in a storage unit of FIG. 1;

DETAILED DESCRIPTION OF THE INVENTION

In the following, embodiments of the present invention are explained with reference to the drawings.

Hardware Configuration

Figure 1:
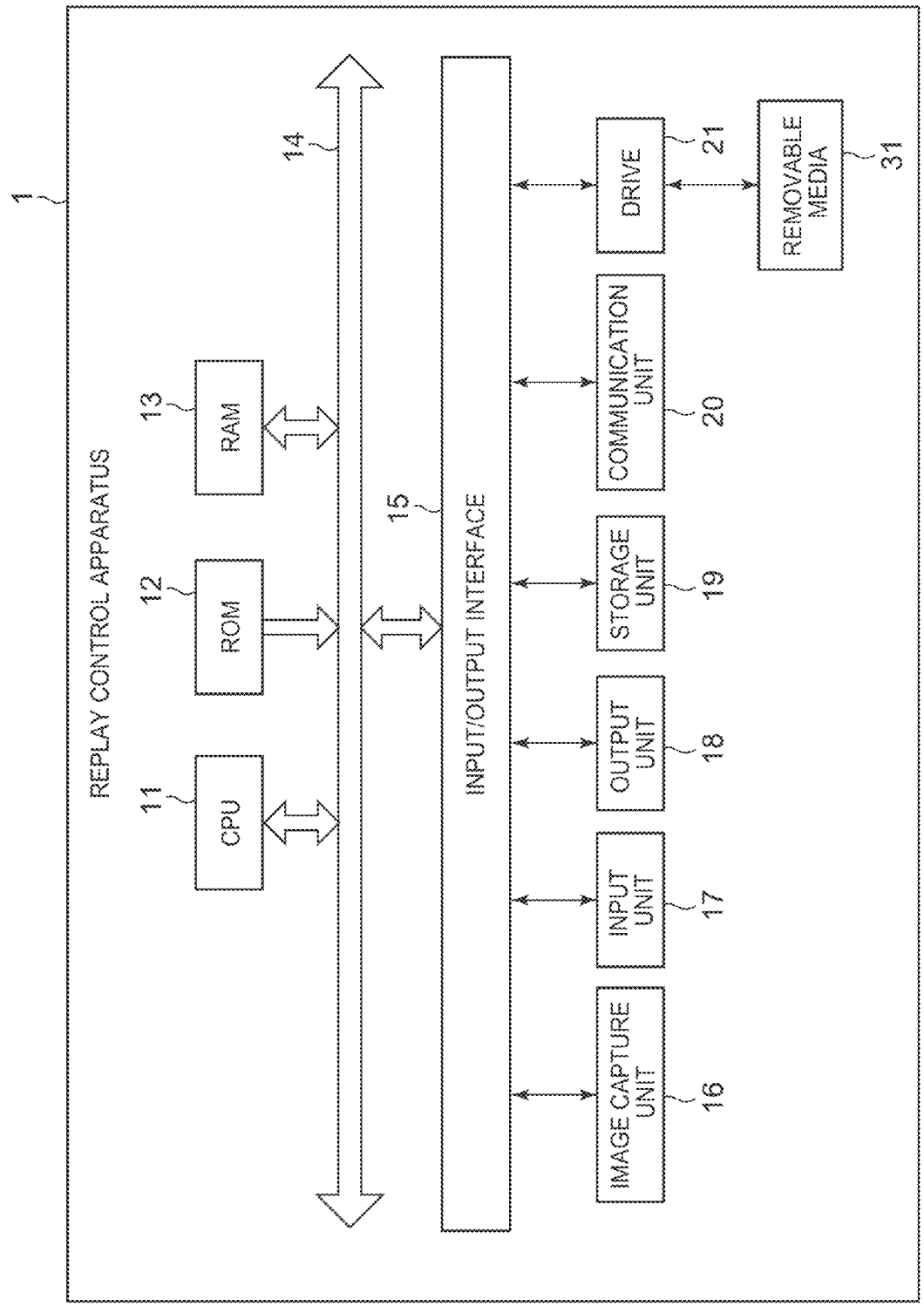
FIG. 1 is a block diagram showing a hardware configuration of a replay control apparatus.

FIG. 1 is a block diagram showing a hardware configuration of a replay control apparatus 1 according to an embodiment of the present invention.

The replay control apparatus 1 is configured as, for example, a digital camera.

The replay control apparatus 1 according to the present embodiment simultaneously replays a plurality of pieces of moving image data included in a set of moving images as a replay target, with the replay condition of a combination of moving image data being associated with each of a plurality of different sets of moving images.

The replay control apparatus 1 includes a CPU (Central Processing Unit) 11, ROM (Read Only Memory) 12, RAM (Random Access Memory) 13, a bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, programs that are loaded from the storage unit 19 to the RAM 13, or programs for two screen replay control processing (described later).

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor (not shown).

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". The data of a captured image is supplied to the CPU 11 and the like as appropriate.

The input unit 17 is configured with various buttons, a pointing device, software keys, and the like and allows for input of various information according to a user's operation of instruction such as a selection of a set of moving images to serve as a two screen replay target in two screen replay control processing, an instruction operation for setting a replay condition for each moving image, and a zooming operation for a zoom lens.

The output unit 18 is configured by the display unit, a speaker, and the like, and outputs images and sound.

The storage unit 19 is configured by a hard disk, DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Functional Configuration

Figure 2:
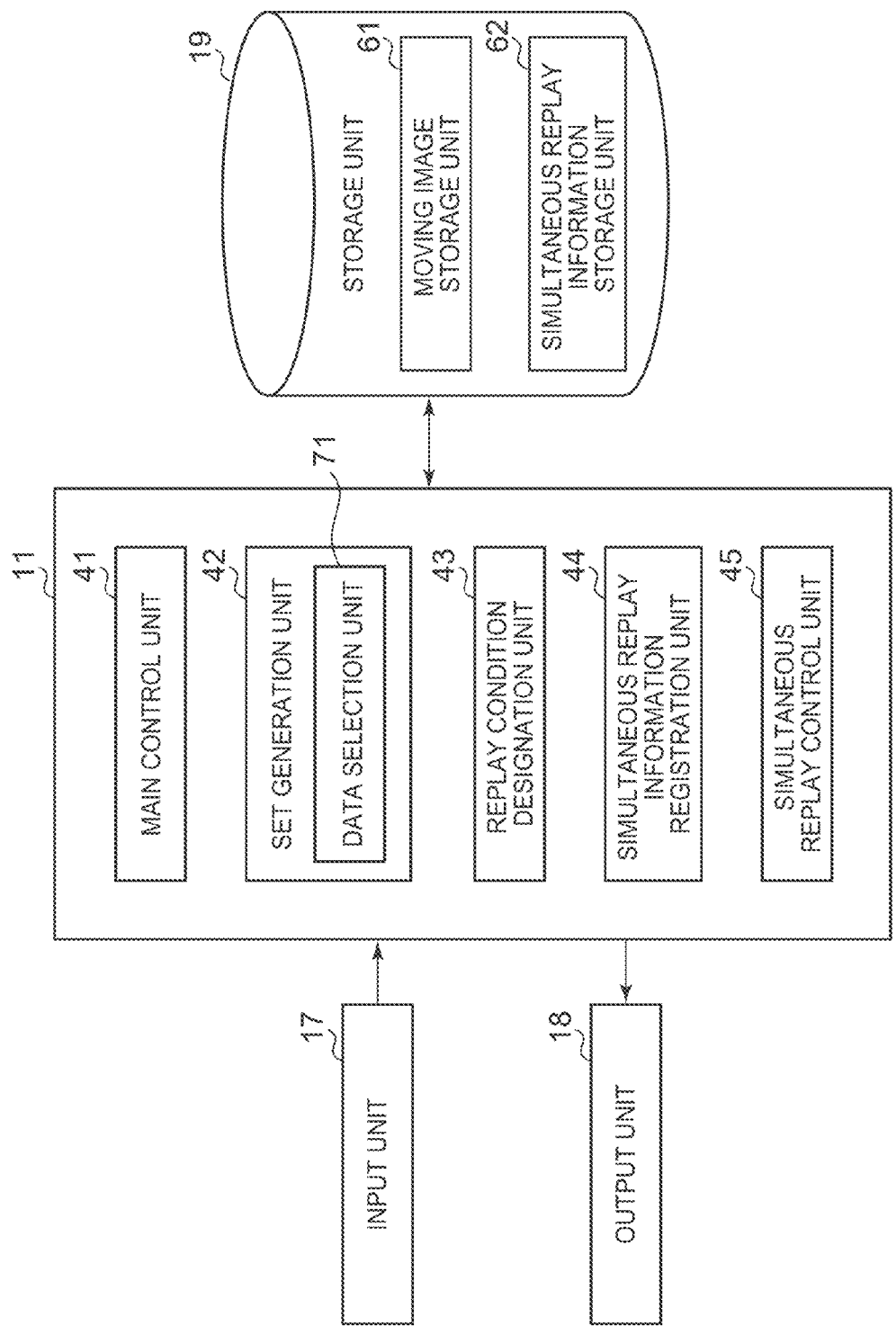
FIG. 2 is a functional block diagram showing a functional configuration for executing multiple screen replay control processing.

FIG. 2 is a functional block diagram showing a functional configuration for executing multiple screen replay control processing, among the functional configurations of the replay control apparatus 1.

The multiple screen replay control processing refers to a sequence of processing of: generating a set of moving images composed of a plurality of pieces of moving image data as a target for simultaneous replay; setting a replay condition for each of the plurality of pieces of moving image data included in the moving image data; and simultaneously replaying the plurality of pieces of moving image data on the same screen based on the replay conditions thus set respectively.

When the multiple screen replay control processing is executed, a main control unit 41, a set generation unit 42, a replay condition designation unit 43, a simultaneous replay information registration unit 44, and a simultaneous replay control unit 45 function in the CPU 11.

A moving image storage unit 61 and a simultaneous replay information storage unit 62 are provided as a certain area of the storage unit 19.

The moving image storage unit 61 stores a plurality of pieces of moving image data that can be a replay target in the multiple screen replay control processing. The moving image data stored in the moving image storage unit 61 may be data of a captured image captured by the image capture unit 16 or may be moving image data supplied externally.

The simultaneous replay information storage unit 62 stores information in which a replay condition for each of a plurality of pieces of moving image data constituting a set of moving images (described later) is associated with information that can identify that the plurality of pieces of moving image data is included in the set of moving images (hereinafter, simply referred to as "information of moving image set"). In the following, the information stored in the simultaneous replay information storage unit 62 is referred to as "simultaneous replay information".

The main control unit 41 controls the replay control apparatus 1 overall when the replay control apparatus 1 executes the multiple screen replay control processing. It should be noted that the details of control of the main control unit 41 are described later with reference to FIG. 4, etc.

The set generation unit 42 generates a new set of moving images by arbitrarily selecting a plurality of pieces of moving image data from among the plurality of pieces of moving image data stored in the moving image storage unit 61.

Furthermore, the set generation unit 42 includes a data selection unit 71.

The data selection unit 71 allows a user to select a plurality of pieces of moving image data to be included in the set of moving images, while displaying a list of the plurality of pieces of moving image data stored in the moving image storage unit 61 (more specifically, thumbnail images, etc.) on the output unit 18.

Furthermore, after one piece of moving image data is selected, the data selection unit 71 determines whether a remaining piece of moving image is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited.

The replay condition designation unit 43 arbitrarily designates the replay condition for simultaneously replaying the plurality of pieces of moving image data included in the set of moving images generated by the set generation unit 42, based on the user's operation of instruction from the input unit 17.

The replay condition designated by the replay condition designation unit 43 refers to various conditions that relate to replay for each of a plurality of pieces of moving image data included in a predetermined moving image set, and become valid only for the predetermined set of moving images.

More specifically, in a case in which first moving image data is included in the plurality of sets of moving images in common, replay conditions for the plurality of moving image sets are designated by the replay condition designation unit 43 so that frame positions for matching the replay timing of the first moving image data differ in accordance with the differences between moving image data of the counterparts to be combined with the first moving image data.

More specifically, in a case in which the first moving image data that is prepared by photographing a model golf swing constitutes a plurality of sets of moving images with a plurality of moving image data prepared by photographing a plurality of golf swings as comparison targets, replay conditions for the plurality of moving image sets are designated by the replay condition designation unit 43 so that frame positions for matching the replay timing of the first moving image data and corresponding to any of a plurality of check points specific to a golf swing differ in accordance with the differences in the check points to be compared in moving image data of the counterparts.

As an example for the replay condition designated by the replay condition designation unit 43, it is possible to employ a condition for matching replay timing for a plurality of pieces of moving image data simultaneously replayed, for example.

More specifically, as a condition for matching replay timing of the plurality of pieces of moving image data simultaneously replayed, in the case of a golf swing, "the condition for matching replay timing of impact", "the condition for matching replay timing of top", and the like are employed.

Furthermore, for example, as a replay condition designated by the replay condition designation unit 43, it is possible to employ a frame position of each piece of moving image data for matching replay timing.

More specifically, as a condition for matching replay timing of a plurality of pieces of moving image data simultaneously replayed, "the number (position) of a frame in which the look of impact is shown", "the number (position) of a frame in which the look of top is shown", and the like are employed in a case of golf swing. Although the position for matching replay timing is not specifically limited here, in specific examples explained with reference to FIG. 6 and later, a frame position of each piece of moving image data for starting replay (hereinafter, also referred to as "start point" as appropriate) is employed.

Furthermore, as a replay condition designated by the replay condition designation unit 43, it is also possible to employ an arrangement condition in a case in which a plurality of pieces of moving image data to be simultaneously replayed is arranged to be aligned on the same screen. In this arrangement condition, any number of various conditions can be set such as the arrangement of each moving image in a horizontal or vertical manner, the relative arrangement of each moving image, the display size of each moving image, and the like.

Figure 3:
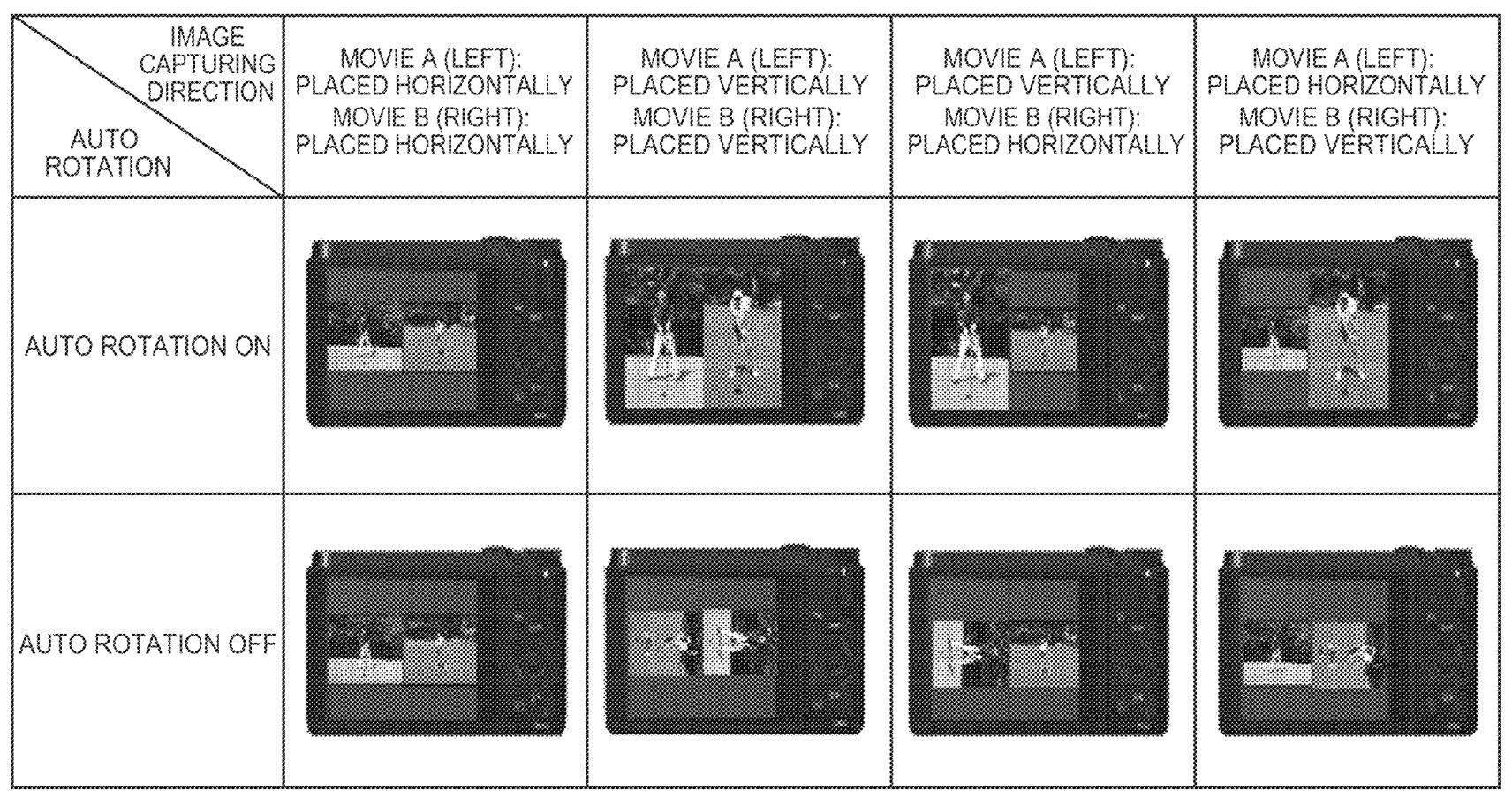

FIG. 3 is a diagram showing a direction-correspondence table for setting an arrangement condition that is stored in the storage unit 19 of FIG. 1.

In the example of FIG. 3, two pieces of moving image data (hereinafter, referred to as "movie A" and "movie B") are replayed simultaneously for the purpose of simplifying explanation. The movie A is arranged on the left side as seen from a viewer and the movie B is arranged on the right side as seen from the viewer.

Various conditions corresponding to photographing directions and ON/OFF of auto rotation as the arrangement condition for each of the movies A and B in a case of the sets of moving images composed of the movies A and B are stored in the direction-correspondence table of FIG. 3.

Here, auto rotation refers to a function of automatically change a display direction of the output unit 18 in a vertical or horizontal direction corresponding to a tilt position of the replay control apparatus 1. Then, this function is activated when "ON" and deactivated when "OFF" (the display direction is locked).

More specifically, for example, the arrangement conditions of each of the movies A and B are set so that, in a case in which both of the movies A and B are recorded in a horizontal photographing direction and the auto rotation is "ON", as shown in row 1 and column 1 in FIG. 3, both of the movies A and B are arranged in the horizontal direction, and in a case in which the replay control apparatus 1 is placed horizontally, the movies A and B are aligned in the horizontal direction; whereas, in a case in which the replay control apparatus 1 is placed vertically, the movies A and B are aligned in the vertical direction.

Furthermore, for example, the arrangement conditions of each of the movies A and B are set so that, in a case in which both the movies A and B are recorded in a vertical photographing direction and the auto rotation is "ON", as shown in row 1 and column 2 in FIG. 3, both the movies A and B are arranged in the vertical direction, and in a case in which the replay control apparatus 1 is placed horizontally, the movies A and B are aligned in the horizontal direction; whereas, in a case in which the replay control apparatus 1 is placed vertically, the movies A and B are aligned in the vertical direction.

Furthermore, for example, the arrangement conditions of each of the movies A and B are set so that, in a case in which the movie A is recorded in the vertical photographing direction and the movie B is recorded in the horizontal photographing direction and the auto rotation is "ON", as shown in row 1 and column 3 in FIG. 3, the movie A is arranged in the vertical direction and the movie B is arranged in the horizontal direction, and in a case in which the replay control apparatus 1 is placed horizontally, the movies A and B are aligned in the horizontal direction; whereas, in a case in which the replay control apparatus 1 is placed in the vertical direction, the movies A and B are aligned in the vertical direction.

Furthermore, for example, the arrangement conditions of each of the movies A and B are set so that, in a case in which the movie A is recorded in the horizontal photographing direction and the movie B is recorded in the vertical photographing direction and the auto rotation is "ON", as shown in row 1 and column 4 in FIG. 3, the movie A is arranged in the horizontal direction and the movie B is arranged in the vertical direction, and the replay control apparatus 1 is placed in the horizontal direction, the movies A and B are aligned in the horizontal direction; whereas, in a case in which the replay control apparatus 1 is placed horizontally, the movies A and B are aligned in the horizontal direction.

Furthermore, for example, the arrangement conditions of each of the movies A and B are set so that, in a case in which both the movies A and B are recorded in the horizontal photographing direction and the auto rotation is "OFF", as shown in row 2 and column 1 in FIG. 3, both the movies A and B are arranged in the horizontal direction and both the movies A and B are aligned in the horizontal direction regardless of the direction in which the replay control apparatus 1 is arranged.

Furthermore, for example, the arrangement conditions of each of the movies A and B are set so that, in a case in which both the movies A and B are recorded in the vertical photographing direction and the auto rotation is "OFF", as shown in row 2 and column 2 in FIG. 3, both the movies A and B are arranged in the vertical direction and both the movies A and B are aligned in the horizontal direction regardless of the direction in which the replay control apparatus 1 is arranged.

Furthermore, for example, the arrangement conditions of each of the movies A and B are set so that, in a case in which the movie A is recorded in the vertical photographing direction and the movie B is recorded in the horizontal photographing direction and the auto rotation is "OFF", as shown in row 2 and column 3 in FIG. 3, both the movie A is arranged in the vertical direction and the movie B is arranged in the horizontal direction and both the movies A and B are aligned in the horizontal direction regardless of the direction in which the replay control apparatus 1 is arranged.

Furthermore, for example, the arrangement conditions of each of the movies A and B are set so that, in a case in which both the movie A is recorded in the horizontal photographing direction and the movie B is recorded in the vertical photographing direction and the auto rotation is "OFF", as shown in row 2 and column 4 in FIG. 3, the movie A is arranged in the horizontal direction and the movie B is arranged in the vertical direction and both the movies A and B are aligned in the horizontal direction regardless of the direction in which the replay control apparatus 1 is arranged.

With reference to FIG. 2 again, the simultaneous replay information registration unit 44 generates simultaneous replay information made by associating the information of a set of moving images set by the set generation unit 42 with a replay condition that is designated by the replay condition designation unit, and stores (registers) it in the simultaneous replay information storage unit.

When a replay condition of a set of moving images as a replay target is designated, the simultaneous replay control unit 45 controls so as to simultaneously replay on a display of the output unit 18 a plurality of pieces of moving image data included in this set of moving images with the replay condition that is associated with the set of moving image thus designated and stored.

As described above, the number of moving image data included in a set of moving images is not specifically limited so long as it is at least two; however, the number thereof is two in the following descriptions for the sake of simplicity. In this case, the multiple screen replay control processing is referred to as "two screen replay control processing".

Operation

Two Screen Replay Control Processing

Next, two screen replay control processing is explained which is executed by the replay control apparatus 1 having the functional configuration of FIG. 2.

Figure 4:
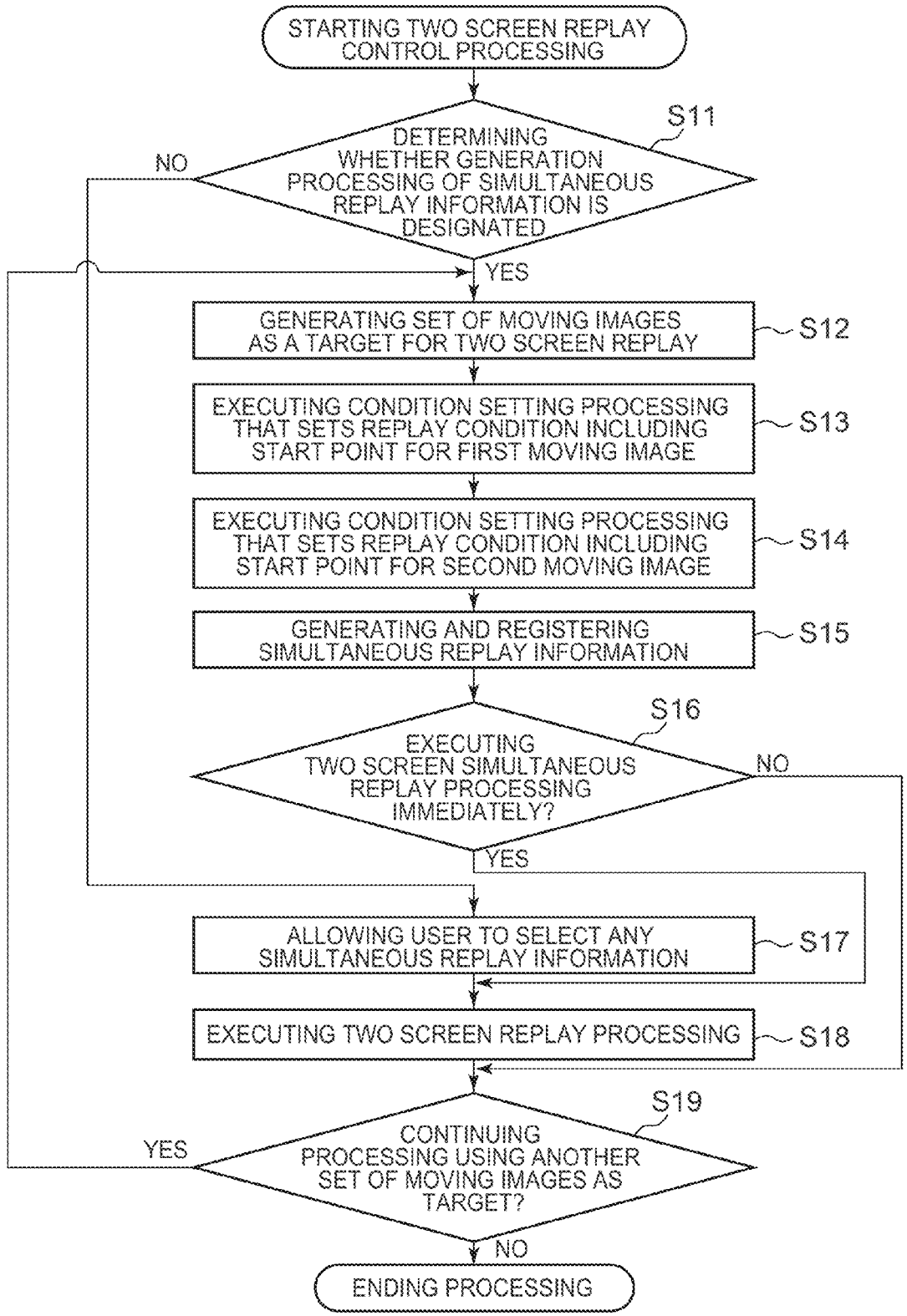
FIG. 4 is a flowchart showing a flow of two screen replay control processing executed by the replay control apparatus 1 having the functional configuration of FIG. 2.

FIG. 4 is a flowchart showing a flow of two screen replay control processing executed by the replay control apparatus 1 having the functional configuration of FIG. 2.

A plurality of modes such as a normal replay mode for moving images, as an operation mode of the replay control apparatus 1, is set in advance, and when a user operates the input unit 17 and chooses the two screen simultaneous replay mode from among these operation modes, the two screen replay control processing starts.

In Step S11, it is determined whether generation processing of simultaneous replay information is designated or not. When it is determined that the generation processing of simultaneous replay information is not designated, the processing advances to Step S17.

It should be noted that the generation processing of simultaneous replay information includes generating simultaneous replay information newly as well as editing simultaneous replay information that is previously generated.

In Step S17, if there is simultaneous replay information stored in the storage unit 19 that is previously registered by processing (described later), the simultaneous replay control unit 45 allows a user to select any simultaneous replay information, and then the processing advances to Step S18.

On the other hand, in Step S11, when it is determined that the generation processing of simultaneous replay information is designated, the processing advances to Step S12, and the set generation unit 42 generates a set of moving images as a target for two screen replay (including processing of editing a set of moving images previously generated as well as generating the set of moving images newly). In the present embodiment, the set generation unit 42 generates a set of moving images composed of first moving image data (for example, the movie A) and second moving image data (for example, the movie B). A specific example of the set of moving images by the set generation unit 42 is described later. Here, some methods for generating a set of moving images employed in the present embodiment are described with reference to FIG. 5.

FIG. 5 is a diagram showing a moving image type-correspondence table for generating a set of moving images, stored in the storage unit 19 of FIG. 1.

In the moving image type-correspondence table of FIG. 5, the conditions of the movie A (the first moving image data) and the movie B (the second moving image data) that can be configured as a set of moving images are stored for each of normal movie, golf BS (best shot) movie, professional golfer movie, respectively.

In the present embodiment, the following seven types set upon photographing are set in advance as types of moving image data that can become the movies A and B. The seven types include FHD (Full High Definition), HD (High Definition), STD (Standard), HS120 (High Speed 120 fps), HS240 (High Speed 240 fps), HS480 (High Speed 480 fps), and HS1000 (High Speed 1000 fps).

In other words, "two screen comparison available with the same type of movie" in FIG. 5 means that two screen simultaneous replay is available if the types of each of the movies A and B is the same type, i.e. a set of moving images can be configured with the movies A and B. It should be noted that, although the two screen simultaneous replay lasts up to five seconds, the present invention is not limited thereto.

With reference to FIG. 4 again, in Step S13, the replay condition designation unit 43 executes condition setting processing of setting (designating) a replay condition including a start point (a replay start position) on the first moving image data from among the moving image data constituting the set of moving images generated in Step S12 (including processing of editing a replay condition previously set as well as setting the replay condition newly). In the present embodiment, the replay condition designation unit 43 designates various conditions for the first moving image data received based on the operation on the input unit 17 by the user as a replay condition. A specific example of the condition setting processing in Step S13 is described later.

In Step S14, the replay condition designation unit 43 executes condition setting processing of setting (designating) a replay condition including a start point (a replay start position) on the second moving image data, from among the moving image data constituting the set of moving images generated in Step S12. In the present embodiment, the replay condition designation unit 43 designates various conditions for the second moving image data received based on the operation on the input unit 17 by the user as a replay condition. A specific example of the condition setting processing in Step S14 is described later.

In Step S15, the simultaneous replay information registration unit 44 generates simultaneous replay information based on a replay condition of each piece of moving image data set in Steps S12 and S13 and additively registers (stores) it in the simultaneous replay information storage unit 62.

In Step S16, the simultaneous replay control unit 45 determines whether to immediately execute the two screen simultaneous replay processing based on simultaneous replay information registered newly. In a case of a NO determination, the processing advances to Step S19.

On the other hand, in a case of a YES determination, the processing advances to Step S18, and the simultaneous replay control unit 45 executes the two screen replay processing based on the simultaneous replay information registered in Step S15 or the simultaneous replay information selected in Step S17. Two screen replay processing refers to the processing of outputting to replay the first moving image and the second moving image constituting the set of moving images generated in Step S12 based on the simultaneous replay information registered in Step S15 from the output unit 18 with the start points thereof being matched. A specific example of the two screen replay processing is described later.

In Step S19, the main control unit 41 determines whether to continue processing for another set of moving image as a target. In a case of processing with another set of moving images being a target continuing, i.e., in a case of a YES determination in Step 19, the processing advances to Step S12. In this case, processing for a new set of moving images as a target is repeatedly executed in Steps S12 to S19. On the other hand, in a case of not processing with another set of moving images being a target continuing, i.e., in a case of a NO determination in Step 19, the two screen replay processing ends.

Next, a specific example of the two screen replay control processing is described with reference to FIGS. 6 to 16B.

First, two screen replay control processing in a case in which simultaneous replay information is unset (not yet generated) is described with reference to FIGS. 6 to 13. FIGS. 6 to 13 are diagrams showing a specific example of two screen replay control processing in a case in which simultaneous replay information is unset.

Figure 6:
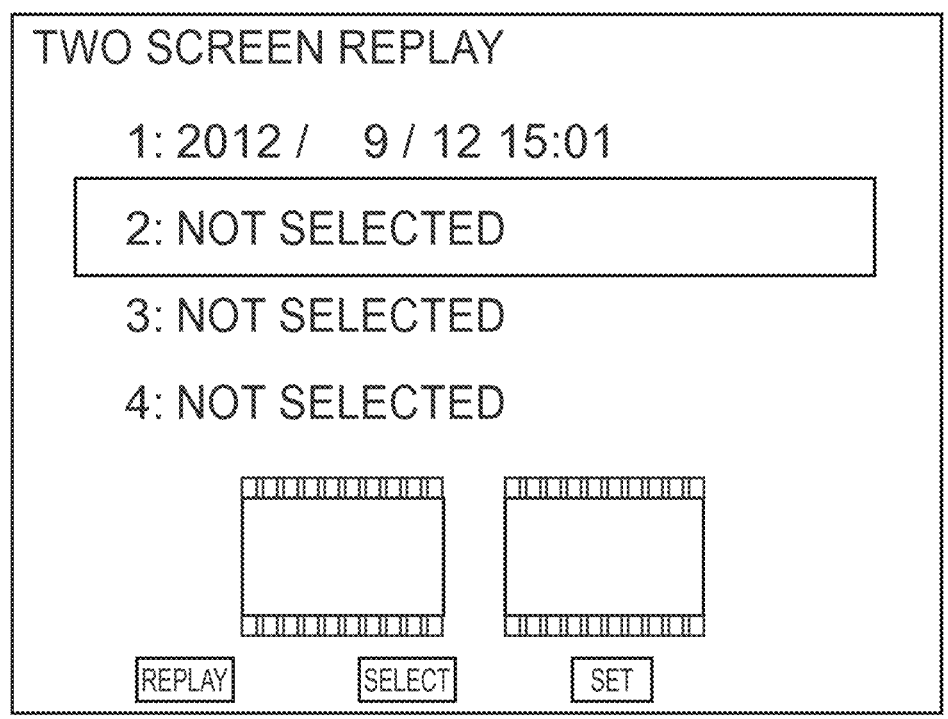
FIG. 6 is a diagram showing a specific example of two screen replay control processing in a case in which simultaneous replay information is unset.

When a user presses a right key of the cursor keys or a SET key on the input unit 17 in the first hierarchy of a PLAY menu while the PLAY menu is being displayed on the display of the output unit 18 (not illustrated), the two screen list screen shown in FIG. 6 is displayed on the display of the output unit 18.

The two screen list screen in FIG. 6 shows that simultaneous replay information is not set (not generated) by showing Not Selected and thumbnail displays without image. In this two screen list screen, it is possible to create lists up to 40/card.

In a case in which a replay key or a set key on the input unit 17 is selected based on the user's operation, the main control unit 41 outputs an error sound from a speaker of the output unit 18 without displaying anything.

Figure 7:
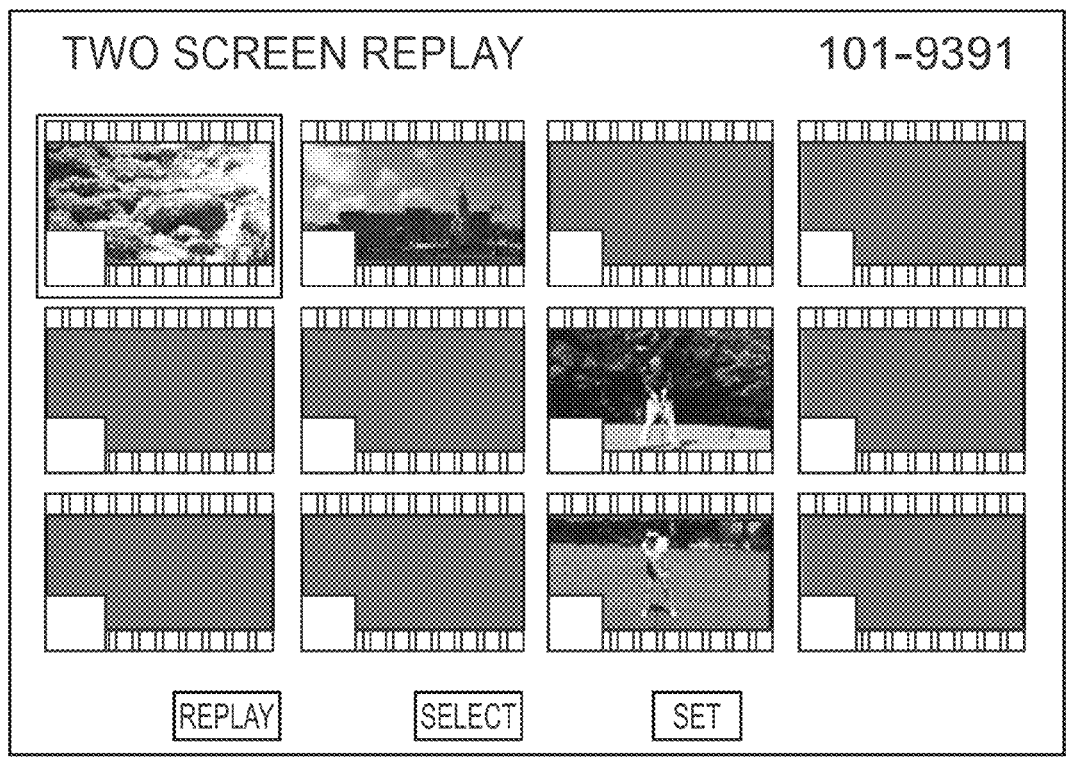
FIG. 7 is a diagram showing a specific example of two screen replay control processing in a case in which simultaneous replay information is unset.

In a case in which a MOVIE key on the input unit 17 is selected based on the user's operation with the two screen list screen being displayed, the two screen selection screen of FIG. 7 (screen for selecting movies for two screen replay) is displayed on the display of the output unit 18.

In the two screen selection screen of FIG. 7, only thumbnails for movies are displayed on the display of the output unit 18. The movies have not been selected in FIG. 7.

In the example of FIG. 7, a piece of movie data that is temporarily selected by operating cursor keys (right key, left key, up key, and down key) of the input unit 17 is displayed by enclosing the piece of movie data entirely by a cursor frame.

In the two screen selection screen of FIG. 7, it is possible to perform single-display of a movie by way of a zoom lever on the input unit 17. By displaying a single movie, it is possible to check an individual time stamp display (time stamp is display constantly). A specific example of displaying a single movie is described later with reference to FIGS. 16A and 16B.

If none of the movies are selected in the two screen selection screen of FIG. 7, the lists thereon are erased and the screen returns to that of FIG. 6 and the two screen list screen is displayed on the display again.

Figure 8:
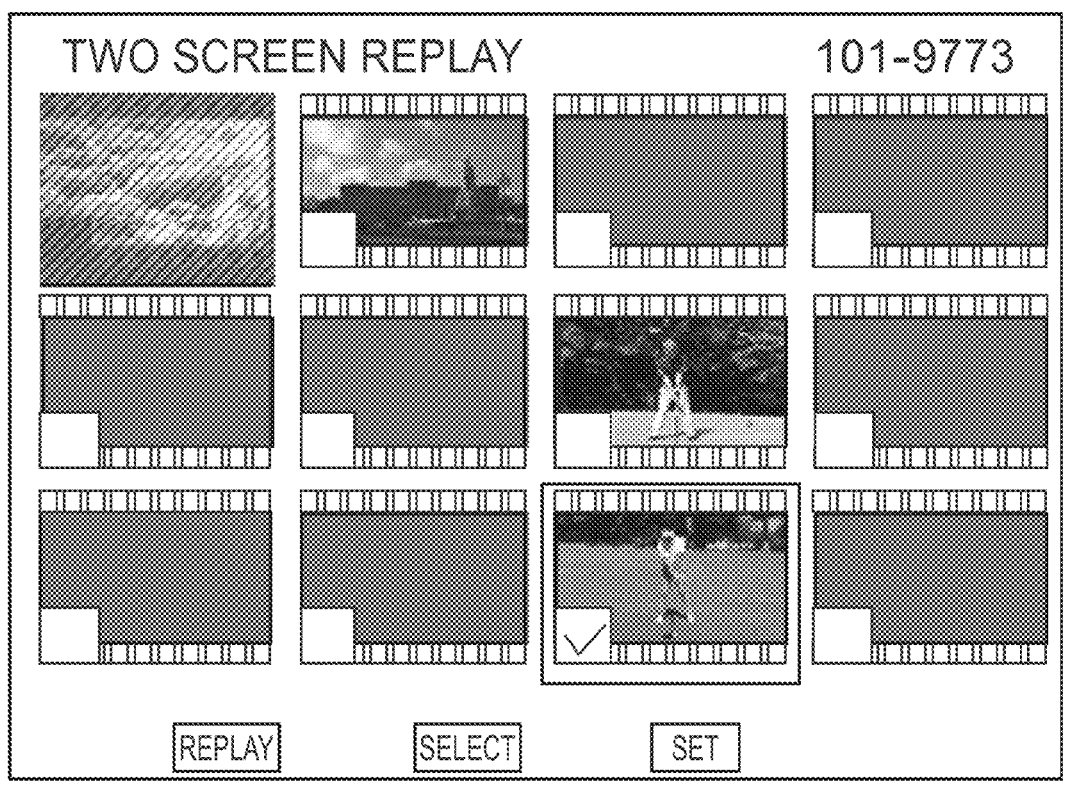
FIG. 8 is a diagram showing a specific example of two screen replay control processing in a case in which simultaneous replay information is unset.

When the SET key of the input unit 17 is pressed based on the user's operation on the two screen selection screen of FIG. 7 after a desired movie is selected by operating the cursor key of the input unit 17 based on the user's operation, an arbitrary movie is selected in the two screen selection screen as shown in FIG. 8.

In the two screen selection screen of FIG. 8, when one arbitrary movie is selected based on the user's operation on the input unit 17, the movie is displayed with hatching by way of OSD (on screen display) on a single/multi selection screen for different types of movies, which indicates that the movie is in a state of being unselectable (for example, refer to the upper left thumbnail in FIG. 8). The different types of movies are movies that are not configured with the same (or similar) type of format. The main control unit 41 references the moving image type-correspondence table of FIG. 5 to determine whether the movie has the same (or similar) type of format.

Alternatively, as a method for determining different types of movies, it may be determined based on types of a main subject captured in a moving image or types of actions of a subject (for example, types of sports such as golf, tennis, and swimming) along with formats of moving images.

In a case in which a movie of different type displayed with hatching by way of OSD based on the user's operation on the input unit 17 is selected while the two screen selection image of FIG. 8 is displayed on the display, the main control unit 41 outputs an error sound from a speaker of the output unit 18 without displaying anything on the display.

When an end key (MENU key) is pressed based on the user's operation of the input unit 17 while one movie is selected, the main control unit 41 displays on the display of the output unit 18 an error message of "please select two files".

In a case in which three movies are selected, the main control unit 41 displays on the display an error message of "three files cannot be selected". The movies selected in the two screen selection screen of FIG. 8 are stored as last memory.

Figure 9:
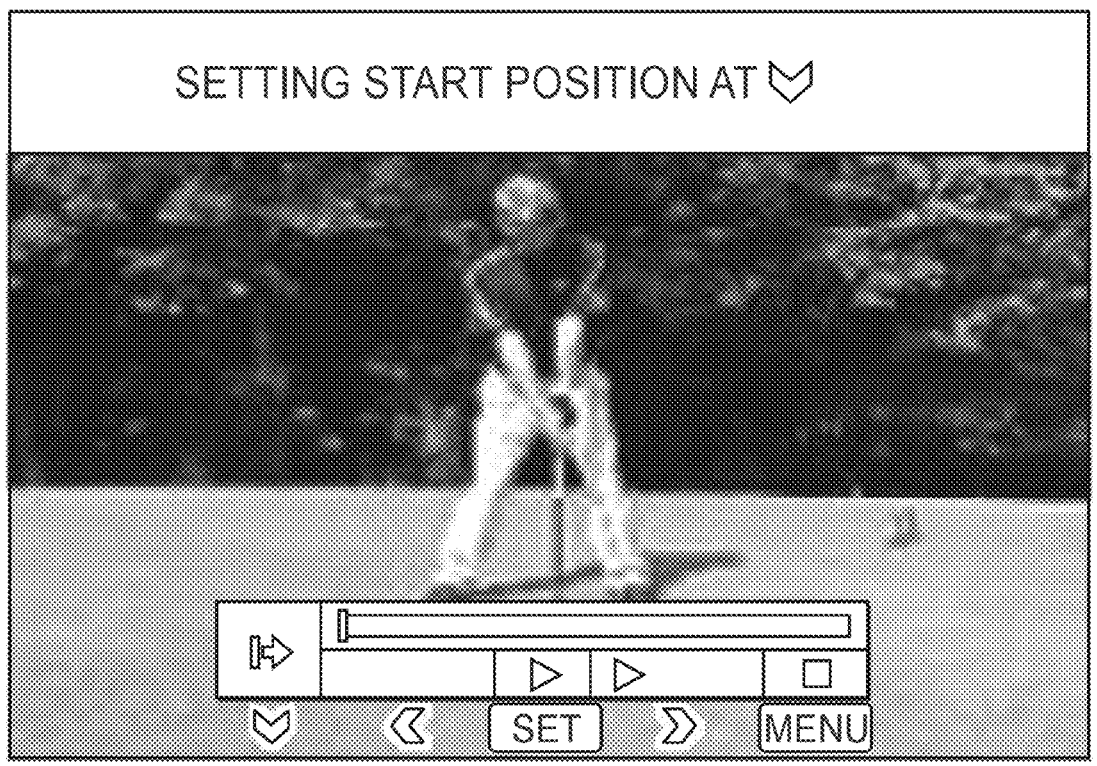
FIG. 9 is a diagram showing a specific example of two screen replay control processing in a case in which simultaneous replay information is unset.

In the two screen selection screen of FIG. 8, when the MENU key of the input unit 17 is pressed, a start point setting screen of one movie (the movie A) is displayed on the display as shown in FIG. 9. The processing in the two screen selection screens from FIGS. 6 to 8 corresponds to the processing of Step 12 of the two screen replay control processing.

In the start point setting screen in FIG. 9, the simultaneous replay control unit 45 starts replaying from a start point. In the start point setting screen of FIG. 9, a replay of a movie is temporarily stopped. Here, the start point refers to a position where the two screen replay starts. In a case in which the simultaneous replay information is not set (generated), the start point of a new movie is set as a head. It should be noted that if the movie is already listed (the start point for the movie is already set), the latest start point is employed. Even if a start point were set which is different from another start point, it would not influence a previous start point.

Figure 10:
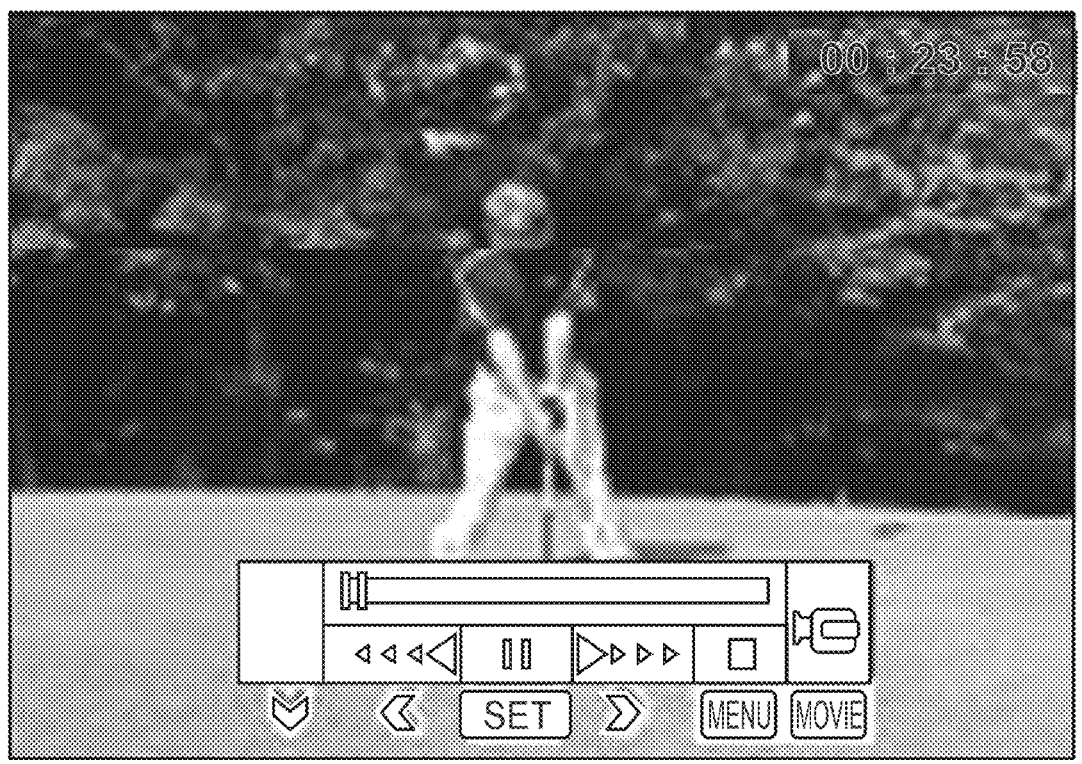
FIG. 10 is a diagram showing a specific example of two screen replay control processing in a case in which simultaneous replay information is unset.

In the start point search screen of FIG. 10, it is possible to adjust a start point set and store it as last memory. It should be noted that, when replaying repeatedly, the simultaneous replay control unit 45 replays repeatedly from the head to the end regardless of a position of the start point.

In the start point setting screen of FIG. 9, when a right or left key of the cursor key of the input unit 17 is pressed, the movie can be fast-forwarded, reversed, or replayed. When the movie is fast-forwarded, reversed, or replayed, the main control unit 41 displays a number of seconds counter indicating a replay position of the movie by superimposing it on the upper right portion of the movie.

In the start point search screen of FIG. 9, when the SET key is pressed based on the user's operation of the input unit 17, the start point search screen is displayed on the display as shown in FIG. 10.

In the start point search screen in FIG. 10, the simultaneous replay control unit 45 starts replaying from the head of the movie. In this case, the simultaneous replay control unit 45 can perform replaying for five seconds from the start point on the basis of actual time. It should be noted that it is possible to replay for 40 seconds with HS240.

In the start point search screen in FIG. 10, the main control unit 41 designates the start point from the newer of DCF (Design rule for Camera File system) numbers (the movie A). The main control unit 41 displays a position display marker on the top in a case of the marker being overlapped.

In the start point search screen in FIG. 10, when the SET key is pressed based on the user's operation of the input unit 17, the start point setting screen of FIG. 9 is displayed on the display again.

Figure 11:
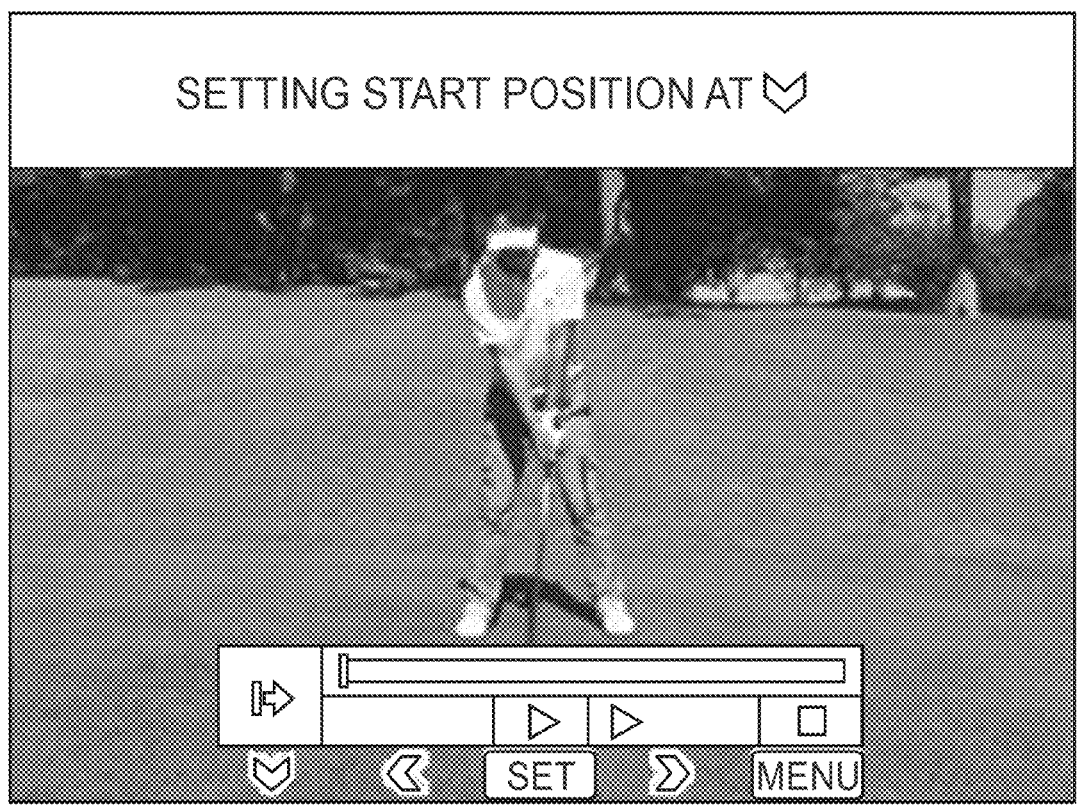
FIG. 11 is a diagram showing a specific example of two screen replay control processing in a case in which simultaneous replay information is unset.

Then, in the start point search screen of FIG. 9, when the down key of the cursor key is pressed based on the user's operation on the input unit 17, a start point of the movie A is set, and a start point setting screen of the other movie (the movie B) is displayed on the display as shown in FIG. 11. The processing in the start point setting screen of FIG. 9 and the start point search screen of FIG. 10 correspond to the processing of Step S13 in the two screen replay control processing.

In the start point setting screen in FIG. 11, the simultaneous replay control unit 45 starts replaying from a start point. In the start point setting screen of FIG. 11, replay of a movie is temporarily stopped. In a case in which the simultaneous replay information is not set (generated), the start point of a new movie is set as a head. It should be noted that if the movie is already listed (the start point for the movie is already set), the latest start point is employed. Even if a start point would be set which is different from another start point, it does not influence a previous start point.

Figure 12:
FIG. 12 is a diagram showing a specific example of two screen replay control processing in a case in which simultaneous replay information is unset.

In a start point search screen of FIG. 12, it is possible to adjust a start point set and store it as last memory. It should be noted that, when replaying repeatedly, the simultaneous replay control unit 45 replays repeatedly from the head to the end regardless of a position of the start point.

In the start point search screen of FIG. 11, when the SET key of the input unit 17 is pressed, a start point search screen is displayed on the display as shown in FIG. 12.

In the start point search screen of FIG. 12, the simultaneous replay control unit 45 starts replaying a movie from the start point. In the start point search screen of FIG. 12, it is possible to fix the start point when the movie is temporarily stopped. The main control unit 41 displays a position display marker on the top in a case of the marker being overlapped. In the start point search screen of FIG. 12, the simultaneous replay control unit 45 replays repeatedly the movie B from the head to the end regardless of the position of the start point.

In the start point search screen of FIG. 12, when the SET key is pressed based on the user's operation on the input unit 17, the start point setting screen of FIG. 11 is displayed again.

Figure 13:
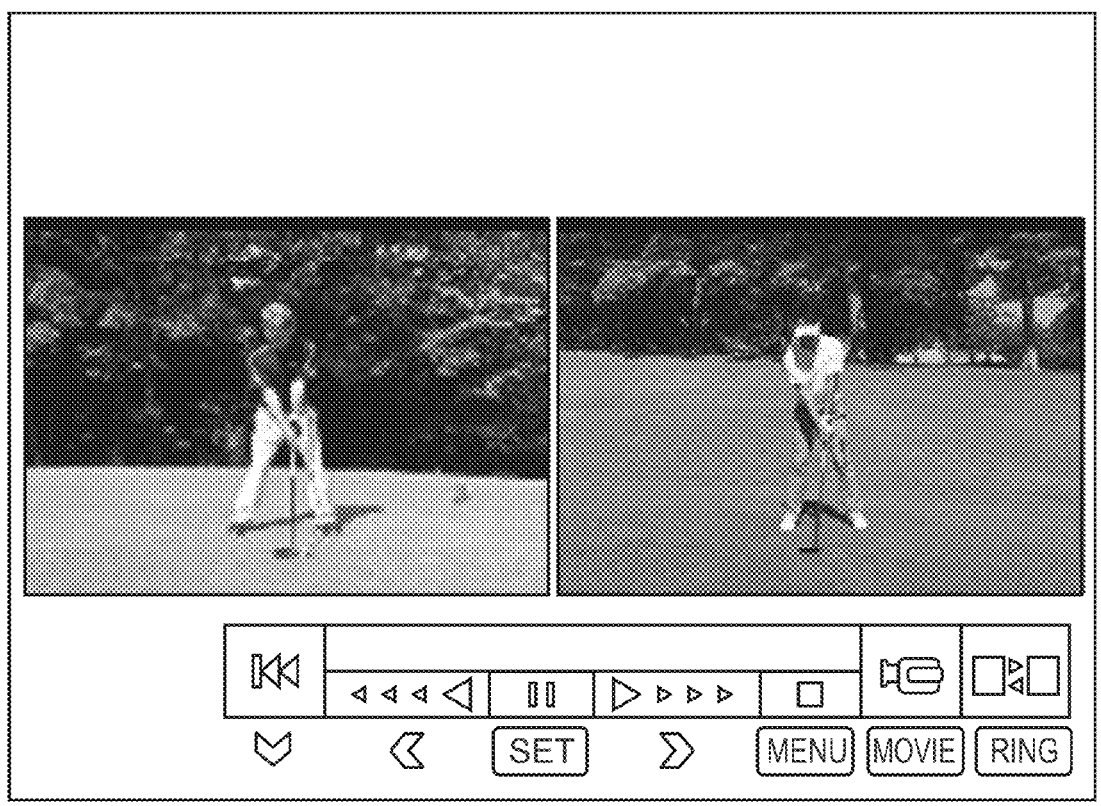
FIG. 13 is a diagram showing a specific example of two screen replay control processing in a case in which simultaneous replay information is unset.

Then, in the start point search screen of FIG. 11, when the down key of the cursor key of the input unit 17 is pressed, the start point of the movie B is set and two screens are replayed on the display as shown in FIG. 13. The processing in the start point setting screen of FIG. 11 and the start point search screen of FIG. 12 correspond to the processing of Step S14 in the two screen replay control processing.

In a two screen during-replay screen, if the two screen simultaneous replay processing is designated to be executed immediately after setting the start point, the simultaneous replay control unit 45 replays the movie A and the movie B immediately at the start points simultaneously. When the replay of both the movie A and the movie B ends, the replay of the movies is temporarily stopped. In this case, the simultaneous replay control unit 45 temporarily stops replaying a movie until the replay of one movie (for example, the movie B) ends while the replay of the other movie already ended (for example, the movie A). When the replay of the movies ends, the two screen replay editing screen is displayed on the display (not illustrated). When "to main screen" is selected by the user's operation on the input unit 17 while the two screen replay editing screen is displayed, the processing transitions to the processing of the two screen list screen of FIG. 6. When "(left) start position change" is selected based on the user's operation on the input unit 17, the processing transitions to the processing of the start point setting screen of FIG. 9. When "(left) movie re-select" is selected based on the user's operation on the input unit 17, the processing transitions to the processing of the two screen selection screen of FIG. 8. When "(right) start position change" is selected based on the user's operation on the input unit 17, the processing transitions to the processing of the start point setting screen of FIG. 11. When "(right) movie re-select" is selected based on the user's operation on the input unit 17, the processing transitions to the processing of the two screen selection screen of FIG. 8. While the left and right movies (the movie A and the movie B) are changed, it transitions to a target movie or the two screen selection screen of a page of the target movie (a cursor is placed on the target movie). It is possible to change both the movies even when the left and right movies (the movie A and the movie B) are being changed. The processing in the two screen during-replay screen of FIG. 13 corresponds to the processing of Step S18 in the two screen replay control processing.

The two screen replay control processing is explained above in a case in which new simultaneous replay information is generated in a list in which simultaneous replay information is unset.

Figure 14:
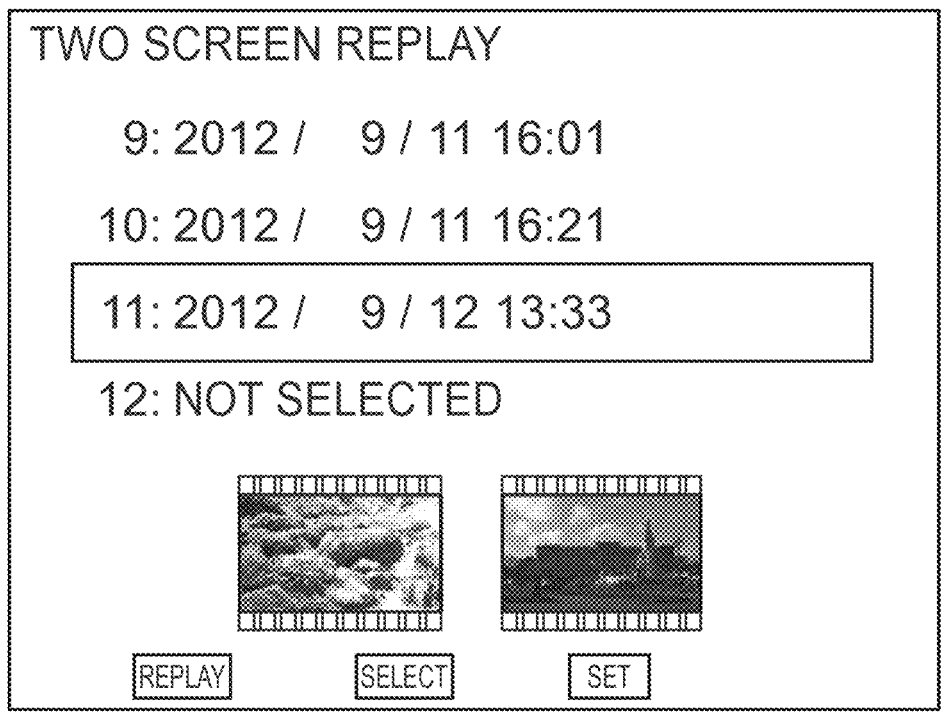
FIG. 14 is a diagram showing a specific example of two screen replay control processing in a case in which simultaneous replay information is set.
Figure 15:
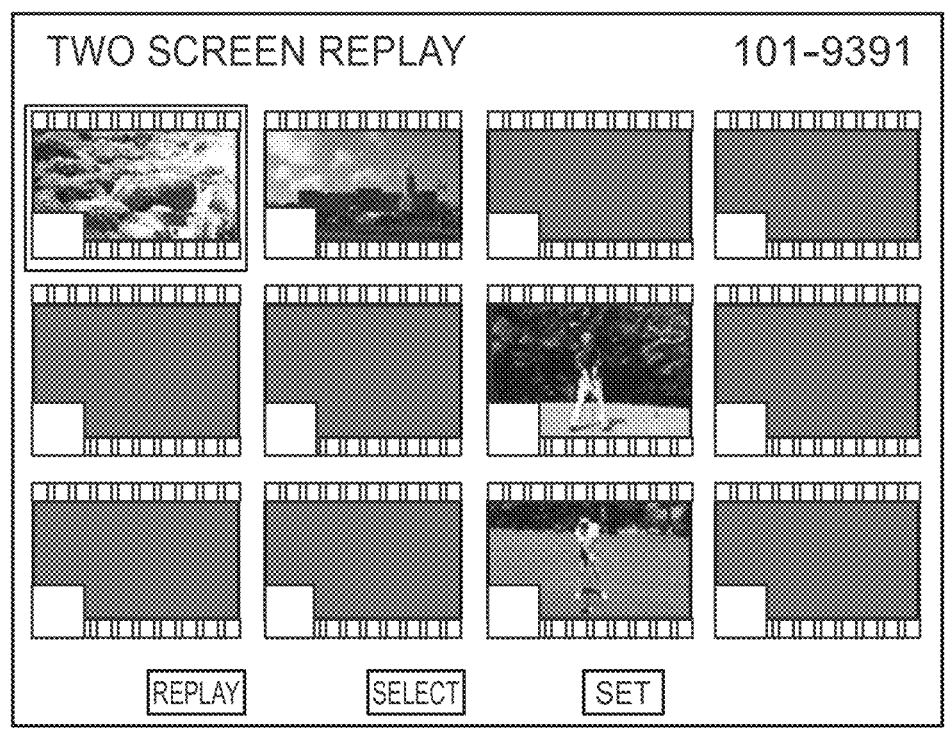
FIG. 15 is a diagram showing a specific example of two screen replay control processing in a case in which simultaneous replay information is set.

Next, with reference to FIGS. 14 and 15, two screen replay control processing is explained in a case of editing contents of simultaneous replay information of a list portion in which simultaneous replay information is set (generated). FIGS. 14 and 15 are diagrams showing specific examples of two screen replay control processing in a case in which simultaneous replay information is set.

For two screen replay control processing in a case in which simultaneous replay information is set, processing is performed which is basically the same as that for the two screen replay control processing (FIGS. 6 to 13) in a case in which the simultaneous replay information is not set. Therefore, for the processing of FIGS. 6 to 13, processing is performed in which screens basically the same as screens of the two screen replay control processing in a case in which simultaneous replay information is set are displayed on a display. However, on the one hand, in a two screen list screen of the two screen replay control processing in a case in which the simultaneous replay information is set, it is indicated by the thumbnail display and the time stamp display of a movie set that the simultaneous replay information is set; on the other hand, in a two screen list screen of the two screen replay control processing in a case in which the simultaneous replay information is not set, it is indicated by Not Selected and thumbnail displays without image that the simultaneous replay information is not set.

Therefore, in the two screen replay control processing in a case in which the simultaneous replay information is set, processing of a two screen list screen of FIG. 14 being displayed on a display is performed in place of the processing of the two screen list screen of FIG. 6 being displayed. Furthermore, the processing of two screen selection screen of FIG. 15 is performed in place of the processing of the two screen selection screen of FIG. 7.

In the following, with reference to FIGS. 14 and 15, two screen replay control processing is explained in a case in which simultaneous replay information is set.

In the two screen list screen of FIG. 14, it is indicated by the thumbnail display and the time stamp display of a movie set that simultaneous replay information is set. This time and date display indicates a time stamp immediately after the two screen processing. In this two screen list screen, it is possible to create lists up to 40/card.

In a case in which a replay key on the input unit 17 is selected based on the user's operation, replay of two screens is performed on the display as shown in FIG. 13. In a case in which an end key on the input unit 17 is selected based on the user's operation, the processing of the start point set screen is performed as shown in FIG. 9.

If not even one piece of movie data set is found, the main control unit 41 outputs an error sound from a speaker of the output unit 18 without displaying anything as Not Selected.

If a MOVIE key on the input unit 17 is selected based on the user's operation with the two screen list screen being displayed, the two screen selection screen of FIG. 15 (a selection screen of a movie for replaying two screens) is displayed on the display of the output unit 18.

In the two screen selection screen of FIG. 15, only thumbnails of movies are displayed on the display of the output unit 18. FIG. 15 shows a state in which a movie has not been selected yet. In the example of FIG. 15, a cursor is placed on a piece of movie data when the MENU key on the input unit 17 is pressed based on the user's operation. In the two screen selection screen of FIG. 15, it is possible to display a single movie by way of a zoom lever on the input unit 17. By displaying a single movie, it is possible to check an individual time stamp display (time stamp is displayed constantly). A specific example of displaying a single movie is described later with reference to FIGS. 16A and 16B.

If none of the movies are selected in the two screen selection screen of FIG. 15, the lists thereon are erased and the screen returns to that of FIG. 14 and the two screen list screen is displayed on the display again.

When the SET key of the input unit 17 based on the user's operation is pressed in the two screen selection screen of FIG. 15 after a desired movie is selected by operating the cursor key of the input unit 17 based on the user's operation, an arbitrary movie is selected in the two screen selection screen as shown in FIG. 8.

The two screen replay control processing in cases in which the simultaneous replay information is set and the simultaneous replay information is unset is explained above.

Figure 16A:
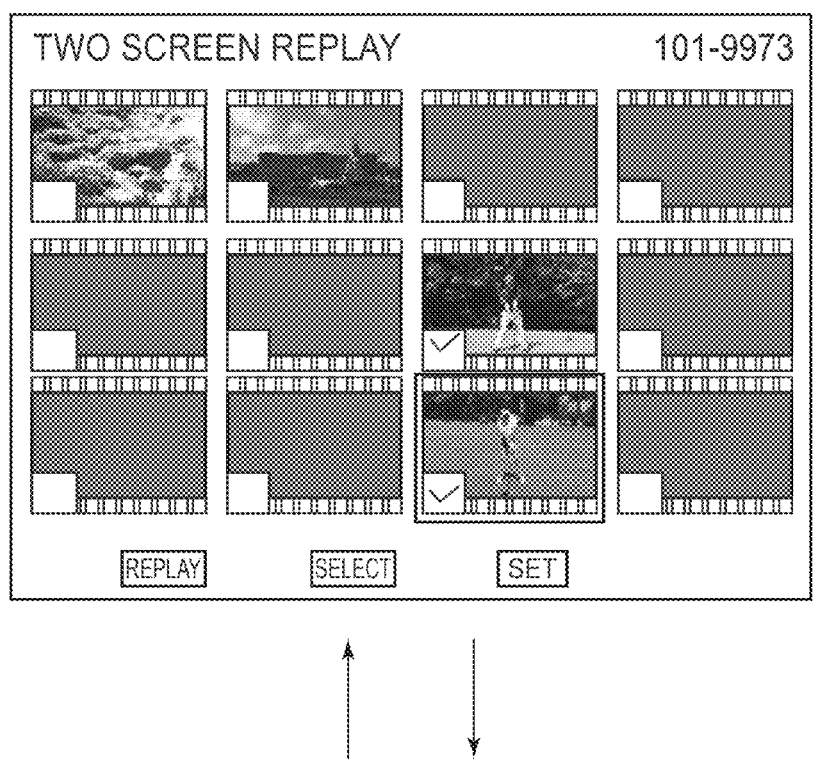
FIGS. 16A and 16B are diagrams showing a specific example of a two screen selection screen of switching between multi-display and single-display performed in the two screen replay control processing.
Figure 16B:
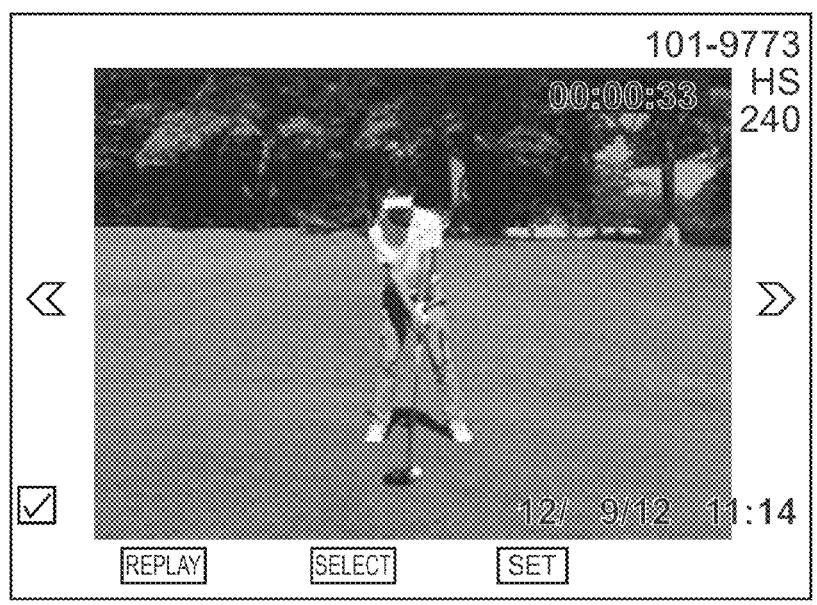

Next, with reference to FIGS. 16A and 16B, an example of a two screen selection screen of switching between multi-display and single-display performed in the two screen replay control processing is explained.

FIGS. 16A and 16B are diagrams showing a specific example of a two screen selection screen of switching between multi-display and single-display performed in the two screen replay control processing.

As shown in FIG. 16A, it is possible to switch between the multi-display and the single-display by the user operating a zoom key of the input unit 17 while the two screen selection multi screen is selected.

For example, when the user selects the zoom key of the input unit 17 while the two screen selection multi screen of FIG. 16A is displayed, a thumbnail of a cursor position is displayed in full-screen and a two screen selection single screen of FIG. 16B is displayed on the display. The two screen selection single screen of FIG. 16B is displayed including recording information and the time stamp display for easy selection. When the user selects the zoom key of the input unit 17 while the two screen selection single screen of FIG. 16B is displayed, the thumbnail becomes small and the two screen selection multi screen of FIG. 16A is displayed on the display.

It should be noted that, when the user presses a right key of the cursor key of the input unit 17 while the two screen selection single screen of FIG. 16B is displayed, a subsequent image is displayed on the display. Similarly, when the user presses a left key of the cursor key of the input unit 17 while the two screen selection single screen of FIG. 16B is displayed, a previous image is displayed on the display.

In addition, it is possible to perform switching an operation target by way of the user operating a ring setting key of the input unit 17. In other words, it is possible to freely set the user's operation of instruction such as replay, stop, slow, and fast-forward of a moving image to both the moving images simultaneously or either one of the moving images (the movie A only or the movie B only).

For example, based on the user's pressing operation of the stop key of the input unit 17 while replaying the two screen simultaneously, the simultaneous replay control unit 45 temporarily stops replaying both the movie A and the movie B simultaneously if the simultaneous operation of the two screens is set and temporarily stops only a movie currently selected from among the movie A and the movie B if the operation for only either one movie (the movie A only or the movie B only) is set.

In this case, when the state in which the replay is temporarily stopped, the simultaneous replay control unit 45 starts replaying again a movie that was stopped by the replay key being pressed again.

It should be noted that an operation bar of the input unit 17 when switching an operation target while replaying the two screens is displayed on the display.

In a case in which the lengths of replaying durations of each movie while replaying on two screens differ, the simultaneous replay control unit 45 temporarily stops the shorter movie in replay duration until replaying of the longer movie ends. Then, when replaying the two movies ends, the simultaneous replay control unit 45 temporarily stops at the final scene of the two movies, respectively.

It should be noted that, when the down key of the cursor key of the input unit 17 is pressed during being temporarily stopped, this operation is different from the pressing operation of the down key of the cursor key while being temporarily stopped normally, the simultaneous replay control unit 45 starts replaying from the start point again.

It should be noted that, when the user presses the down key of the cursor key of the input unit 17, the main control unit 41 switches between display and non-display of various software keys (the operation bar) displayed on the display.

In addition, the replay control apparatus 1 of the above-mentioned embodiment can perform an advanced form analysis by aligning and comparing two movies in FHD/STD/HS horizontally or vertically.

Furthermore, comparable data are FHD/HD/STD/HS120/HS240/HS480/HS1000 only (including continuous files) and still images can be set as non-target. It should also be noted that not only movies photographed with the best shot for golf mode, but also movies recorded with the normal photography mode can be compared. However, it is also possible to limit the comparison only for the same type of movies.

In the present embodiment, selection while replaying two screens can be allowed any number of times, and can be set so that there is no limitation for number of times. However, it is possible to set not to allow two screen comparison of identical two movies. Furthermore, the position display marker (displaying the movie replaying position) in the two screen replay is not displayed, but the operation bar can be displayed. It should be noted that it is possible to set so as not to arrange the operation bar in a vertical manner and to set to display it in a normal manner constantly.

Furthermore, in a case of creating another combination (hereinafter, referred to as a list) using movies in which the start point setting is done, it is possible to create start points based on the start points that are already set. In this case, it is possible to skip editing the start points.

It should be noted that it is also possible to set so as not to affect start points of the same movies in another list even if editing the start points. Furthermore, it should be noted that, in a case of using movies in which a plurality of start points are set, it is possible to set so as to be based on the start point that is set finally.

Furthermore, in a case of replaying a movie, which was replayed in two screens, in a single screen (the start point setting is done), it is possible to ignore the start point and replay a movie as conventionally done.

Furthermore, for the order of the two screen replay, data with newer number of DCF (Design rule for Camera File system) or data arranged in the system region can be disposed at the left side on the display.

Furthermore, regarding the two screen replay, in order to compare a user and the like with a skillful player such as a professional golfer, it is possible to arrange movie data of a professional golfer in the system region, which can only be erased by way of a specific file, and compare with the movie of the professional golfer in the two screens. In this case, it is possible to set so as to use the movie of the professional golfer many times.

In addition, data of the system region can be displayed regularly while replaying as with normal data (even when embedded memory or an SD memory card is used). However, it is also possible to set to be non-compliant except for slide show and magnification replay.

Furthermore, it is possible to set sound replay during the two screen replay to be disabled. Furthermore, it is possible to set a condition in which a movie of a professional golfer is downloaded from the WEB for a sample of a two screen list so as to compare two screens after the replay control apparatus 1 is powered up. For example, it is possible to set a file name of the movie of a professional golfer as "CIMG0001.mov" and the date as "2012/1/1".

Furthermore, in the movie of a professional golfer, it is possible for a user to change a selection of two screens and change a start point. Furthermore, in a case in which an SD memory card is write protected, an error message is displayed while selecting "two screen replay" on the menu setting.

Furthermore, combination data of two screen replay is stored in an SD memory card (for example, it is possible to set "EXILIM" for a folder name and set "dmp.bin" for a file name).

As described above, a replay control apparatus 1 of the present embodiment that controls replaying as a unit a set of moving images that is composed of a plurality of pieces of moving image data as a target for simultaneous replay includes a simultaneous replay information storage unit 62 and a simultaneous replay control unit 45.

The simultaneous replay information storage unit 62 stores a replay condition when simultaneously replaying the plurality of pieces of moving image data constituting the set of moving images so as to correspond to each of the sets of moving images in which a combination of the plurality of pieces of moving image data is different, respectively.

The simultaneous replay control unit 45 simultaneously replays, in a case in which the set of moving images as a replay target is designated from among a plurality of sets of moving images stored in the simultaneous replay information storage unit, a plurality of pieces of moving image data constituting the set of moving images, with a replay condition that is stored to be associated with the designated set of moving images.

In this way, even if the set of moving images as a target for simultaneous replay is switched, it is still possible to replay the set of moving images so as to easily compare a plurality of pieces of moving images in accordance with the set of moving images.

The replay control apparatus 1 of the present embodiment further includes: a set generation unit 42; a replay condition designation unit 43, and a simultaneous replay information registration unit 44.

The set generation unit 42 generates a new set of moving images by selecting a plurality of pieces of arbitrary moving image data from among a plurality of pieces of moving image data. The replay condition designation unit 43 designates a replay condition when simultaneously replaying a plurality of pieces of moving image data constituting the generated set of moving images. The simultaneous replay information registration unit 44 registers information indicating the association of the set of moving images with the replay condition by adding as simultaneous replay information to the simultaneous replay information storage unit.

It is thereby possible to designate a replay condition for each of sets of the moving images as a target for simultaneous replay and register it as the simultaneous replay information. Therefore, when a set of moving images for which the simultaneous replay information is registered in advance is generated, it is possible to simultaneously replay each piece of the moving images with a predetermined replay condition without designating a replay condition again.

Furthermore, the replay condition of the replay control apparatus 1 of the present embodiment is a condition that matches a replay timing of a plurality of pieces of moving image data that is simultaneously replayed.

By setting the replay timing of each of pieces of the moving image data having different time axes as replay conditions, it thereby becomes possible to easily perform analysis of a certain form in sports such as golf, baseball, tennis, etc., comparing growth records, comparing and analyzing physical experiments or study in school, and the like.

Furthermore, the replay condition of the replay control apparatus 1 of the present embodiment includes a frame position of each piece of moving image data for matching the replay timing.

When simultaneously replaying a plurality of moving images which are separately recorded (for example, normal moving images and high-speed moving images), it is thereby possible to simultaneously replay based on frame positions of each piece of moving data constituting the sets of the moving images. Therefore, when the set of moving images for which the simultaneous replay information is registered in advance is generated, it is possible to simultaneously replay easily based on the frame position included in the replay condition.

Furthermore, the replay condition of the replay control apparatus 1 of the present embodiment includes a frame position (a start point) of each piece of moving image data for starting a replay.

In this way, since it is possible to replay moving images from the start point of each set of the moving image data constituting the set of moving images, it is possible to simultaneously replay each of the moving images easily with a predetermined replay condition.

Furthermore, in a case in which first moving image data is included in common in a plurality of sets of moving images, the replay control apparatus 1 of the present embodiment is designated so that a frame position that matches a replay timing of the first moving image data differs depending on a difference in moving image data of a counterpart that is combined with the first moving image data.

In this way, the replay condition is designated so that a frame position that matches a replay timing of the first moving image data differs depending on a difference in moving image data of a counterpart that is combined with the first moving image data. Therefore, when the set of moving images that is combined with the first moving image data in advance is generated, it is possible to simultaneously replay the first moving image data and the moving image data of the counterpart from a desired frame position, respectively, without designating a replay condition again.

Furthermore, regarding the replay control apparatus 1 of the present embodiment, in a case in which first moving image data that is prepared by photographing a model golf swing constitutes a plurality of sets of moving images with a plurality of moving image data prepared by photographing a plurality of golf swings as comparison targets, the replay condition is designated so that frame positions for matching the replay timing of the first moving image data and corresponding to any of a plurality of check points specific to a golf swing differ in accordance with a difference in the check points to be compared in moving image data of the counterpart.

In this way, it is designated so that frame positions corresponding to any of a plurality of check points specific to a golf swing of the first moving image data differ in accordance with a difference in the check points to be compared in moving image data of the counterpart. Therefore, by simultaneously replaying from a desired frame position such as a frame position at which a replay timing of impact in a golf swing is matched and a frame position at which a replay timing of top is matched, it becomes possible to easily compare and replay each golf swing.

Furthermore, the replay control apparatus 1 of the present embodiment includes a data selection unit 71.

The data selection unit 71 allows a user to select a plurality of pieces of moving image data to be included in a set of moving images, while displaying a list of the plurality of pieces of moving image data on a predetermined display device. Then, after one piece of moving image data is selected, the data selection unit 71 determines whether a remaining piece of moving image is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited.

By the user only selecting moving image data in the state of not being prohibited, it is thereby possible to select only moving image data appropriate for simultaneous replaying. Therefore, it becomes possible for the user to simultaneously replay based on moving image data that are easily compared without paying too much attention.

Furthermore, the replay condition of the replay control apparatus 1 of the present embodiment includes an arrangement condition in a case in which a plurality of pieces of moving image data to be simultaneously replayed is arranged to be aligned on the same screen.

It is thereby possible to designate the arrangement condition such as setting of placing each of the moving images in a vertical or horizontal manner, the arrangement of relative positioning of each of the moving images, the display sizes of each of the moving images, and the like as a replay condition. Therefore, for example, when moving image data of the same type of the arrangement condition is selected, it is possible to compare and simultaneously replay each of the moving images with a desirable arrangement condition without designating a replay condition again.

The replay control apparatus 1 of the present embodiment further includes a moving image storage unit 61.

The set of moving images expresses moving image data that is stored in the moving image storage unit 61. Then, the simultaneous replay control unit 45 reads from the moving image storage unit 61 and simultaneously replays a plurality of pieces of moving image data constituting the set of moving images designated.

By preparing in advance the moving image data as a target for the set of moving images, it is thereby possible to easily compare and replay a plurality of pieces of moving image data.

The replay control apparatus 1 of the present embodiment further includes the image capture unit 16 and the main control unit 41. The image capture unit 16 captures moving image data. Then, the main control unit 41 stores the moving image data captured by the image capture unit 16 in the moving image storage unit 61. It is thereby possible to immediately set the moving image data acquired by image capturing as a target for simultaneously replaying.

Furthermore, the replay control apparatus 1 of the present embodiment further include the communication unit 20.

The communication unit 20 receives a piece of moving image data designated from among a plurality of pieces of moving image data stored in an external device. The set of moving images expresses moving image data that can be received by the communication unit 20. The simultaneous replay control unit 45 receives by way of the communication unit 20 and simultaneously replays a plurality of pieces of moving image data constituting the set of moving images designated. It is thereby possible to set the moving image data acquired at an external device as a target for simultaneously replaying.

It should be noted that the present invention is not to be limited to the aforementioned embodiment, and that modifications, improvements, etc. within a scope that can achieve the object of the present invention are also included in the present invention.

Furthermore, in the abovementioned embodiment, although the set of moving images generated by the set generation unit 42 is composed of two pieces of moving image data, the present invention is not limited thereto. For example, the set generation unit 42 can generate a set of moving images with three or more pieces of moving image data.

Furthermore, although a processed unit of a moving image is a frame in the abovementioned embodiment, the present invention is not limited thereto and may be a field and the like, for example. In other words, if an image corresponding to a so-called "segment" like a frame or a field is referred to as a "unit image", a moving image is composed of a plurality of unit images. Therefore, it is possible to use the unit image as a processed unit of a moving image.

In the aforementioned embodiments, a personal computer has been described as an example of the replay control apparatus 1 to which the present invention is applied; however, the present invention is not particularly limited thereto.

For example, the present invention can be applied to any electronic apparatus in general having an image processing function. More specifically, for example, the present invention can be applied to a television, a video camera, a portable navigation device, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), Blu-ray Disc, an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. A replay control apparatus that controls replay of moving image data, the apparatus comprising:
    a storage unit that stores (i) a plurality of pieces of information of a set of moving images constituting a combination of a plurality of pieces of moving images, and (ii) simultaneous replay information made by associating each piece of information of a plurality of the sets of moving images with a replay condition when simultaneously replaying a plurality of pieces of moving image data constituting each of the pieces of information of the set of the moving images;
    a simultaneous replay control unit that, in a case in which the information of the set of moving images as a replay target is designated from among information of a plurality of sets of moving images stored in the storage unit, simultaneously replays a plurality of pieces of moving image data constituting information of the set of moving images having been designated, with a replay condition that is stored in association with the set of moving images having been designated;
    a data selection unit that allows a user to arbitrarily designate a plurality of pieces of moving image data to be included a set of moving images, while displaying a list of the plurality of pieces of moving image data on a predetermined display device, wherein after one piece of moving image data is selected, the data selection unit determines whether a remaining piece of moving image is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited;
    a set generation unit that generates a new set of moving images including a plurality of the pieces of moving image data designated arbitrarily by the data selection unit;
    a replay condition designation unit that designates a replay condition when simultaneously replaying a plurality of pieces of moving image data constituting the generated set of moving images; and
    a registration unit that adds and registers, in the storage unit, (i) information of the generated set of moving images constituted by a combination of the plurality of pieces of moving image data designated arbitrarily by the data selection unit, and (ii) information indicating the association of the replay condition designated by the replay condition designation unit with the information of the generated set of moving images as simultaneous replay information,
    wherein the simultaneous replay control unit utilizes the information added and registered by the registration unit and allows a user to select information of an arbitrary set of moving images as a target of simultaneous replay from among information of a plurality of sets of moving images having different combinations of the plurality of pieces of moving images stored in the storage unit.

2. The replay control apparatus according to claim 1, wherein, in a case in which simultaneous replay information as the replay target is designated from among a plurality of pieces of simultaneous replay information stored in the storage unit, the simultaneous replay control unit simultaneously replays the plurality of pieces of moving image data constituting the information of a set of moving images included in the simultaneous replay information, with a replay condition that is included in the simultaneous replay information having been designated.

3. The replay control apparatus according to claim 2, wherein the replay condition is a condition that matches a replay timing of the plurality of pieces of moving image data that are simultaneously replayed.

4. The replay control apparatus according to claim 3, wherein the replay condition includes a frame position of each piece of the moving image data for matching the replay timing.

5. The replay control apparatus according to claim 4, wherein the replay condition includes a frame position of each piece of the moving image data for starting a replay.

6. The replay control apparatus according to claim 5, wherein, in a case in which first moving image data that is prepared by photographing a model golf swing constitutes information of a plurality of sets of moving images by being combined with a plurality of pieces of moving image data prepared by photographing a plurality of golf swings as comparison targets, the replay condition is designated so that frame positions for matching the replay timing of the first moving image data and corresponding to any of a plurality of check points specific to a golf swing differ in accordance with a difference in the check points to be compared in moving image data of the counterpart.

7. The replay control apparatus according to claim 4, wherein in a case in which first moving image data is included in common in information of a plurality of sets of moving images in a combination, the replay condition is designated so that a frame position that matches a replay timing of the first moving image data differs depending on a difference in moving image data of a counterpart that is combined with the first moving image data.

8. The replay control apparatus according to claim 1, wherein the replay condition includes an arrangement condition in a case in which a plurality of pieces of moving image data to be simultaneously replayed are arranged to be aligned on a same screen.

9. The replay control apparatus according to claim 1, further comprising:
    a moving image storage unit that stores a plurality of pieces of moving image data,
    wherein the information of the set of moving images expresses moving image data that is stored in the moving image storage unit, and
    wherein the simultaneous replay control unit reads from the moving image storage unit and simultaneously replays the plurality of pieces of moving image data constituting the information of the set of moving images having been designated.

10. The replay control apparatus according to claim 9, further comprising:
an image capture unit that captures moving image data; and
a storage control unit that stores the moving image data captured by the image capture unit in the moving image storage unit.

11. The replay control apparatus according to claim 1, further comprising:
a communication unit that receives a piece of moving image data designated from among a plurality of pieces of moving image data stored in an external device,
wherein the information of the set of moving images expresses moving image data that is receivable by the communication unit, and
wherein the simultaneous replay control unit receives, by way of the communication unit, and simultaneously replays the plurality of pieces of moving image data constituting the information of the set of moving images having been designated.

12. A replay control method executed by a replay control apparatus that controls replay of moving image data and includes a storage unit that stores (i) a plurality of pieces of information of a set of moving images constituting a combination of a plurality of pieces of moving images and (ii) simultaneous replay information made by associating each piece of information of a plurality of the sets of moving images with a replay condition when simultaneously replaying a plurality of pieces of moving image data constituting each of the pieces of information of the set of the moving images, the method comprising:
a simultaneous replay control step of, in a case in which the information of the set of moving images as a replay target is designated from among information of a plurality of sets of moving images stored in the storage unit, simultaneously replaying a plurality of pieces of moving image data constituting information of the set of moving images having been designated, with a replay condition that is stored in association with the set of moving images having been designated;
a data selection step that allows a user to arbitrarily designate a plurality of pieces of moving image data to be included in a set of moving images, while displaying a list of the plurality of pieces of moving image data on a predetermined display device, wherein after one piece of moving image data is selected, the data selection unit determines whether a remaining piece of moving image is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited;
a set generation step that generates a new set of moving images including a plurality of the pieces of moving image data designated arbitrarily by the data selection step;
a replay condition designation step that designates a replay condition when simultaneously replaying a plurality of pieces of moving image data constituting the generated set of moving images; and
a registration step that adds and registers, in the storage unit, (i) information of the generated set of moving images constituted by a combination of the plurality of pieces of moving image data designated arbitrarily by the data selection step, and (ii) information indicating the association of the replay condition designated by the replay condition designation unit with the information of the generated set of moving images as simultaneous replay information
wherein the simultaneous replay control step utilizes the information added and registered by the registration step and allows a user to select information of an arbitrary set of moving images as a target of simultaneous replay from among information of a plurality of sets of moving images having different combinations of the plurality of pieces of moving images stored in the storage unit.

13. A non-transitory computer-readable storage medium having a program stored thereon for controlling a computer of a replay control apparatus that controls replay of moving image data and includes a storage unit that stores (i) a plurality of pieces of information of a set of moving images constituting a combination of a plurality of pieces of moving images and (ii) simultaneous replay information made by associating each piece of information of a plurality of the sets of moving images with a replay condition when simultaneously replaying a plurality of pieces of moving image data constituting each of the pieces of information of the set of the moving images, the program being executable to control the computer to function as:
a simultaneous replay control unit that, in a case in which the information of the set of moving images as a replay target is designated from among information of a plurality of sets of moving images stored in the storage unit, simultaneously replays a plurality of pieces of moving image data constituting information of the set of moving images having been designated, with a replay condition that is stored in association with the set of moving images having been designated;
a data selection unit that allows a user to arbitrarily designate a plurality of pieces of moving image data to be included a set of moving images, while displaying a list of the plurality of pieces of moving image data on a predetermined display device, wherein after one piece of moving image data is selected, the data selection unit determines whether a remaining piece of moving image is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited;
a set generation unit that generates a new set of moving images including a plurality of the pieces of moving image data designated arbitrarily by the data selection unit;
a replay condition designation unit that designates a replay condition when simultaneously replaying a plurality of pieces of moving image data constituting the generated set of moving images; and
a registration unit that adds and registers, in the storage unit, (i) information of the generated set of moving images constituted by a combination of the plurality of pieces of moving image data designated arbitrarily by the data selection unit, and (ii) information indicating the association of the replay condition designated by the replay condition designation unit with the information of the generated set of moving images as simultaneous replay information, wherein the simultaneous replay control unit utilizes the information added and registered by the registration unit and allows a user to select information of an arbitrary set of moving images as a target of simultaneous replay from among information of a plurality of sets of moving images having different combinations of the plurality of pieces of moving images stored in the storage unit.

14. A replay control apparatus that controls replaying as a unit a set of moving images that is composed of a plurality of pieces of moving image data as a target for simultaneous replay, the apparatus comprising:
 a simultaneous replay information storage unit that stores a replay condition when simultaneously replaying the plurality of pieces of moving image data constituting the set of moving images so as to correspond to each of the sets of moving images in which a combination of the plurality of pieces of moving image data is different, respectively;
 a simultaneous replay control unit that, in a case in which the set of moving images as a replay target is designated from among a plurality of sets of moving images stored in the simultaneous replay information storage unit, simultaneously replays a plurality of pieces of moving image data constituting the designated set of moving images, with a replay condition that is stored to be associated with the designated set of moving images;
 a data selection unit that allows a user to select a plurality of pieces of moving image data to be included in a set of moving images, while displaying a list of the plurality of pieces of moving image data on a predetermined display device;
 a set generation unit that generates a new set of moving images including a plurality of pieces of moving image data which are arbitrarily selected by the data selection unit;
 a replay condition designation unit that designates a replay condition when simultaneously replaying a plurality of pieces of moving image data constituting the generated set of moving images; and
 a simultaneous replay information registration unit that registers information indicating the association of the set of moving images with the replay condition by adding as simultaneous replay information to the simultaneous replay information storage unit,
 wherein, after one piece of moving image data is selected, the data selection unit determines whether a remaining piece of moving image data is inappropriate for simultaneous replay with the one piece of moving image data selected, and causes the plurality of pieces of moving image data to be list displayed on the predetermined display device, in a state in which selection of the piece of moving image data that was determined to be inappropriate is prohibited.

* * * * *